(12) United States Patent
Young et al.

(10) Patent No.: US 6,375,574 B1
(45) Date of Patent: Apr. 23, 2002

(54) TORSIONAL VIBRATION DAMPERS

(75) Inventors: A J Young, Kenilworth; J F Fitzpatrick-Ellis, Warwick; A J Lambert, Leamington Spa, all of (GB)

(73) Assignee: AP TMF Limited, Leamington Spa (GB)

(*) Notice: Subject to any disclaimer, the term of this patent is extended or adjusted under 35 U.S.C. 154(b) by 0 days.

(21) Appl. No.: 09/194,250

(22) PCT Filed: Mar. 27, 1998

(86) PCT No.: PCT/GB98/00941

§ 371 Date: Apr. 16, 1999

§ 102(e) Date: Apr. 16, 1999

(87) PCT Pub. No.: WO98/44276

PCT Pub. Date: Oct. 8, 1998

(30) Foreign Application Priority Data

Mar. 27, 1997 (GB) ............................................. 9706466
Jan. 23, 1998 (GB) ............................................. 9801329
Feb. 13, 1998 (GB) ............................................. 9803046

(51) Int. Cl.[7] ................................................ F16D 3/12
(52) U.S. Cl. ...................... 464/68; 192/201; 192/211; 464/97; 464/7
(58) Field of Search ........................... 74/574; 464/7, 464/62, 66, 68; 192/201, 211, 110 B (56) References Cited

U.S. PATENT DOCUMENTS

| | | | |
|---|---|---|---|
| 5,557,984 A | * | 9/1996 | Cooke et al. ................. 74/574 |
| 5,697,845 A | * | 12/1997 | Curtis ......................... 192/201 |
| 5,819,598 A | * | 10/1998 | Cooke et al. ................. 74/574 |
| 5,848,938 A | * | 12/1998 | Curtis et al. .................. 464/66 |
| 5,890,572 A | * | 4/1999 | Hirayanagi et al. ........ 192/3.29 |
| 5,941,134 A | * | 8/1999 | Cooke et al. ................. 74/574 |
| 6,029,539 A | * | 2/2000 | Young ......................... 74/574 |
| 6,041,678 A | * | 3/2000 | Cooke et al. ................. 74/574 |

* cited by examiner

Primary Examiner—Lynne H. Browne
Assistant Examiner—Aaron M Dunwoody
(74) Attorney, Agent, or Firm—Paul E Milliken; Ray L Weber (57) ABSTRACT

A torsional vibration damper, which may be in the form of a twin mass flywheel, and which has an input member (11) designed to rotate generally in a first plane (A1), an output member (12) designed to rotate generally in a second plane (A2), relative rotation of the input and output members being possible against the action of a link-type damper (40). The damper is arranged to allow the first and second planes in which the input and output members rotate to tilt relative to each other during use of the damper to relieve internal stresses. This ability to tilt may be provided by self-aligning main bearings (50) or by the use of self-aligning pivot bearings (65) in the link-type damper.

24 Claims, 10 Drawing Sheets

TORSIONAL VIBRATION DAMPERS

FIELD OF THE INVENTION

The present invention relates to torsional vibration dampers used in vehicle drive-lines. Such dampers may comprise a twin mass flywheel or may be used in combination with a fluid coupling in a drive-line or may be used on their own in a drive-line.

Known twin mass flywheels include an input flywheel and an output flywheel which can rotate relative to each other to transmit power from an engine to a transmission and reduce torque fluctuations. Relative rotation of the flywheel masses is enabled by a bearing and the rotation is resisted by some form of damping means.

DESCRIPTION OF RELATED ART

Examples of such devices are disclosed in granted patents GB 2229793, GB 2151332 and pending applications GB 2296072, W096/18832.

The axis of rotation of the engine power output shaft (engine crankshaft) is designed to rotate about an axis co-linear with the axis of rotation of the input shaft to the transmission. However under some working conditions the engine crankshaft can flex causing the input flywheel which is attached to the end of the crankshaft, to tip out of its nominal plane of rotation. The output flywheel which is attached to the input shaft to the transmission endeavours to rotate about its original axis in its nominal plane of rotation. This can cause the damping means which connects the input and output flywheels to become stressed and hence its working life is reduced. Furthermore this stressing can cause the bearing which allows the input and output flywheels to rotate relative to each other to have a reduced service life.

Similar problems can arise when the torsional vibration damper is used in combination with a fluid coupling as shown, for example, in earlier patent applications GB 2220464 and PCT/GB97/00362 where flexing of the engine crankshaft can cause the torsional vibration damper to be subjected to significant stresses which may reduce its service life.

It is an object of the present invention to provide a torsional vibration damper which at least partially mitigates the above problem.

SUMMARY OF THE INVENTION

Thus according to the present invention there is provided a torsional vibration damper comprising an input member designed to rotate generally in a first plane, an output member designed to rotate generally in a second plane, relative rotation of the input and output members being possible against the action of a damping means, the damper being characterised in that the first and second planes in which the input and output members rotate are able to tilt relative to each other during use of the damper.

The torsional vibration damper may be in the form of a twin mass flywheel in which the input and output members comprise input and output flywheel masses respective supported from each other for relative rotation via bearing means, the damper being characterised in that the bearing means is self-aligning to allow said tilting.

The torsional vibration damper may include bob weights which act to resist relative rotation of the input and output members, the bob weights being pivotally mounted on one member and having a connection with the other member. The pivotal mounting of the bob weights on said one member may be in the form of a self-aligning bearing.

The invention also provides a twin mass flywheel comprising a first and a second flywheel mass which can rotate relative to each other, the relative rotation being controlled by a damping means including a bob weight pivotally mounted on one flywheel mass and connected with the other flywheel mass, the flywheel being characterised in that the pivotal mounting on the one flywheel mass being in the form of a self-aligning bearing.

According to a further aspect of the invention there is provided a twin mass flywheel comprising a first and second flywheel mass which can rotate relative to each other, the relative rotation being controlled by damping means comprising a bob weight pivotally mounted on one flywheel mass and connected with the other flywheel mass by a link, one end of said link being pivotally connected to the bob weight and the other end of said link being pivotally connected to the other flywheel mass, the flywheel being characterized in that the pivotal connection of the link with the bob weight and/or the pivotal connection of the link with the other flywheel mass is in the form of a self-aligning bearing.

According to a further aspect of the present invention there is provided a torsional vibration damper comprising input and output members which can rotate relative to each other against the action of a damping means comprising at least one linkage arrangement, the or each linkage arrangement comprising a multi-link linkage having two or more circumferentially spaced main links pivotally mounted on one of the members with the or each circumferentially arranged pair of main links interconnected via a generally circumferentially extending connecting linkage pivotally connected at each end to respective main links, and an anchor link which pivotally connects the multi-link linkage with the other member, relative rotation of the input and output members causing the multi-link linkage to be pivoted relative to said one member by the anchor link, so that when the damper is rotating, relative rotation of the members is resisted by centripetal forces acting on the linkage arrangement, the damper being characterised in that at least one of the pivots of the multi-link linkage and/or anchor link being in the form of a self-aligning bearing.

The above torsional vibration damper may be in the form of a twin mass flywheel in which the input and output members comprise input and output flywheel masses respectively supported from each other for relative rotation via bearing means, the damper being characterised in that the bearing means is self-aligning.

The invention also provides a twin mass flywheel in which the bearing means which supports the flywheel masses for relative rotation has at least one of its inner or outer peripheries supported in a resilient support carried by the associated flywheel mass to allow said tilting.

The resilient support may comprise a resilient tolerance ring or a resilient plastics sleeve.

The tolerance ring may include generally radially extending projections which engage a groove or other formation in the associated bearing and/or a flange or other portion for attachment to the associated flywheel mass to locate the bearing axially relative to the associated flywheel mass.

BRIEF DESCRIPTION OF THE DRAWINGS

The invention shall now be described, by way of example only, with reference to the accompanying drawings in which.

DETAILED DESCRIPTION OF THE INVENTION

Figure 1:
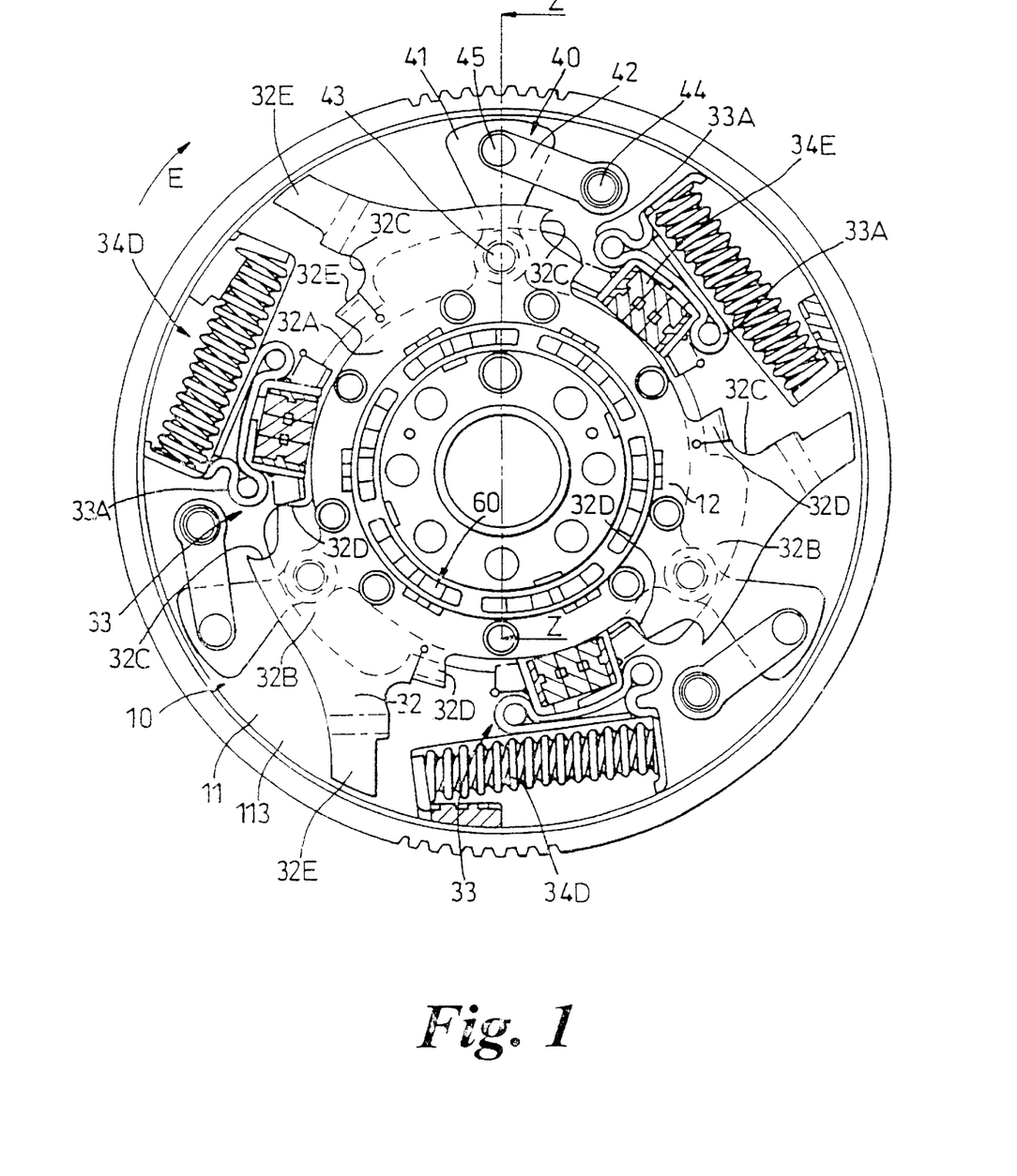
FIG. 1 is an axial sectional view of a twin mass flywheel taken in the direction B of FIG. 2.
Figure 2:
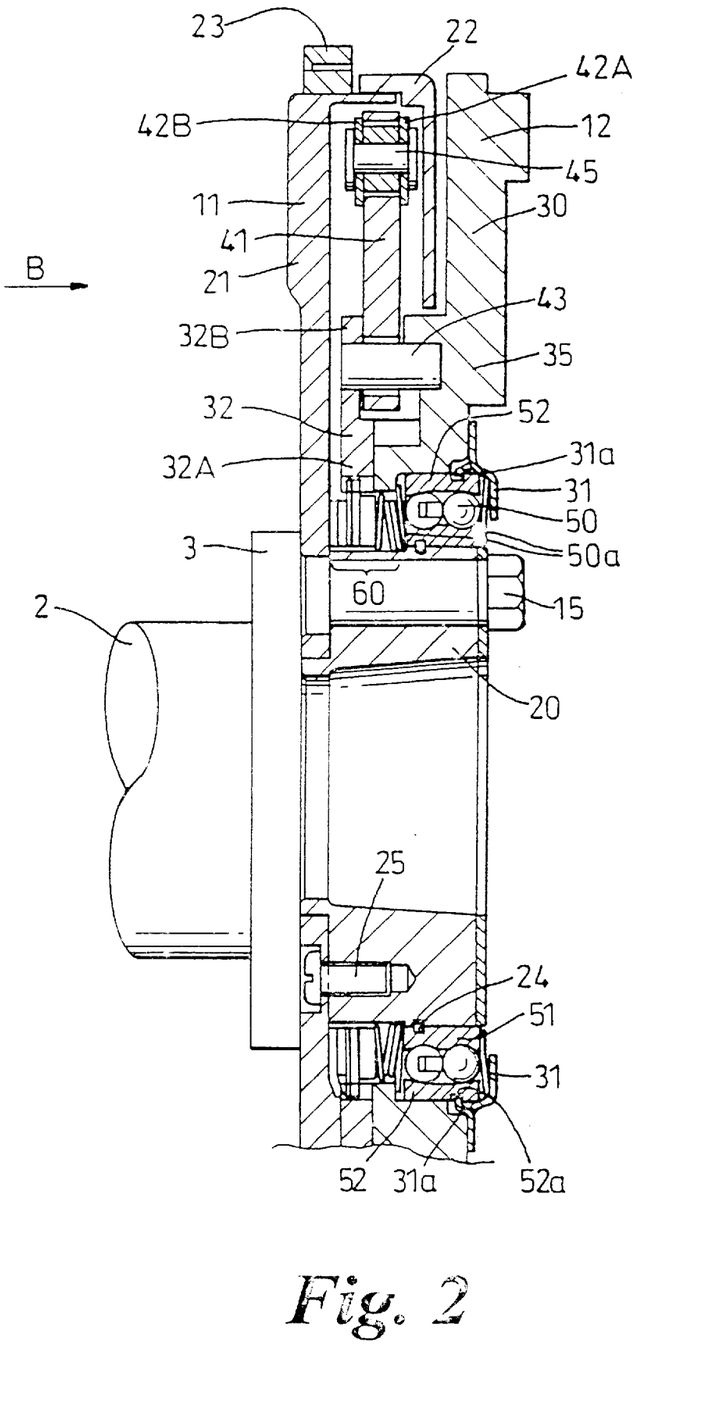
FIG. 2 is a sectional view taken along the line ZZ of FIG. 1.
Figure 3:
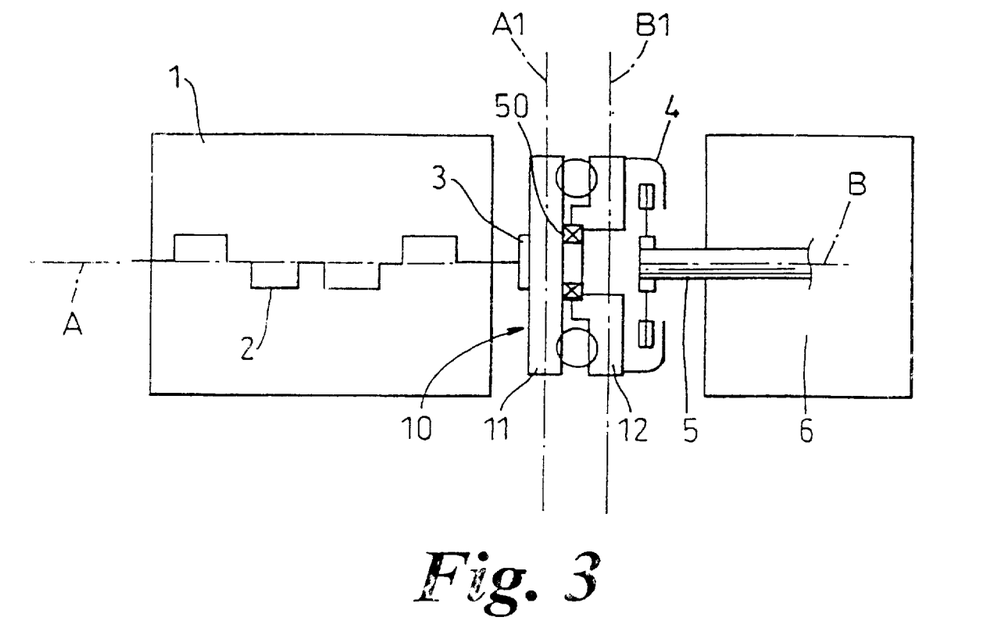
FIG. 3 is a diagrammatic representation of a twin mass flywheel with associated engine and gearbox.

With reference to FIGS. 1, 2 and 3 there is illustrated a twin mass flywheel 10 which is formed by two flywheel masses 11 and 12. One flywheel mass 11 (also known as the input flywheel mass) is fixed to a crankshaft 2 of an internal combustion engine 1 by way of a central hub 20 and bolts 15. A friction clutch 4 is secured to the second flywheel mass 12 (also known as the output flywheel mass) to connect the second flywheel mass with the input shaft 5 of an associated gearbox 6.

The flywheel mass 11 comprises a central hub 20, an input plate 21, a cover plate 22, and a starter ring 23 which is welded to the input plate 21. Cover plate 22 is secured at its outer periphery to input plate 21. Circlip 24 secures the inner race 51 of bearing 50 axially relative to the hub 20. The input plate 21 is fixed to hub 20 by screws 25 prior to assembly onto the engine, and then also by the main bolts 15.

The second flywheel mass 12 comprises an output plate 30 a bearing retaining plate 31, and a pivot plate 32 all rotationally fast with each other.

Under normal drive conditions and over-run conditions the twin mass flywheel 10 as a whole rotates in a clockwise direction in the view shown in FIG. 1 as indicated by arrow E. The engine crankshaft nominally rotates about axis A and the gear box input shaft nominally rotates about axis B. Design of the engine, twin mass flywheel and gearbox assembly endeavours to ensure that axis A and B are co-linear. However this is not always the case, especially under running conditions.

Pivot plate 32 has an annular inner portion 32A with a plurality of lugs 32B which form part of pivots 43, a plurality of lugs 32C which in conjunction with abutments 33A form an end stop arrangement 33, and a plurality of lugs 32D,32E which act on respective spring units 34D 34E.

Relative rotation between two flywheel masses 11 and 12 is controlled by a damping means which primarily comprises a plurality of pivotal linkages 40. The damping means also comprises the plurality of spring units 34D,34E, a friction damping device 60 and the plurality of end stop arrangements 33. All these components assist in controlling the relative rotation of the two flywheel masses 11 and 12 at specific relative angular positions or in specific angular ranges.

Each pivotal linkage 40 comprises a first link 41 (also known as a bobweight link) pivotally mounted between a centre hub portion 35 of the output plate 30 and pivot plate 32 by way of a first pivot 43, and a second link 42 ( in the form of a parallel pair of arms 42A and 42B) pivotally mounted on the output flywheel mass 12 ( by way of a second pivot 44). The two links 41 and 42 pivotally connected to each other and bobweight 41 by means of a third pivot 45. It will be noted from FIG. 1 that the first pivot 43 is positioned radially inwardly of the second and third pivots 44 and 45.

Under no-load conditions with the clutch 4 disengaged, centrifugal force acts on the pivotal linkages 40 and particularly on the first bobweight link 41 and urges the linkages in a radially outward direction with pivot 45 adopting a position radially outboard of pivot 43 as shown in FIG. 1 (this position is regarded as the neutral position between the drive and over-run directions of relative rotation of the flywheel masses). At higher rotational speeds the centrifugal force is greater and whilst this does not affect the configuration under no-load conditions it greatly affects the force required to move the flywheel mass 12 relative to the flywheel mass 11 i.e. the flywheel torsional stiffness.

If the clutch is engaged and power is transmitted in the drive direction from flywheel mass 11 to flywheel mass 12 there is a tendency for the two masses to rotate relative to each other (flywheel mass 11 rotates clockwise relative to flywheel mass 12 when viewing FIG. 1). At relatively low speeds when the influence of centrifugal force is smaller the flywheel masses move readily relative to each other i.e. the flywheel torsional stiffness is relatively low. However at relatively high speeds the influence of centrifugal force is much greater and relative rotation of the flywheel masses requires greater force i.e. the flywheel torsional stiffness is relatively high. Thus the flywheel torsional stiffness is speed sensitive.

If the clutch is engaged and power is transmitted in the over-run direction from flywheel mass 12 to flywheel mass 11 the effects are similar to the above except that the direction of relative rotation is reversed (flywheel mass 11 rotates anticlockwise relative to flywheel mass 12 when viewing FIG. 1) and in the embodiment shown in FIG. 1 the first link 41 folds between the second link 42 i.e. between arms 42A and 42B.

Input flywheel 11 is supported for rotation relative to output flywheel 12 by bearing 50 which in accordance to the present invention is a self-aligning bearing, in this case a double row self-aligning ball bearing which is held in position by retaining member 31 which has finger 31a which engages a groove 52a in the outer race 52 and sections 31b which shield the bearing and also react one of the centralising Belleville springs 50a. Retaining member 31 is secured to output plate 30.

Figure 4:
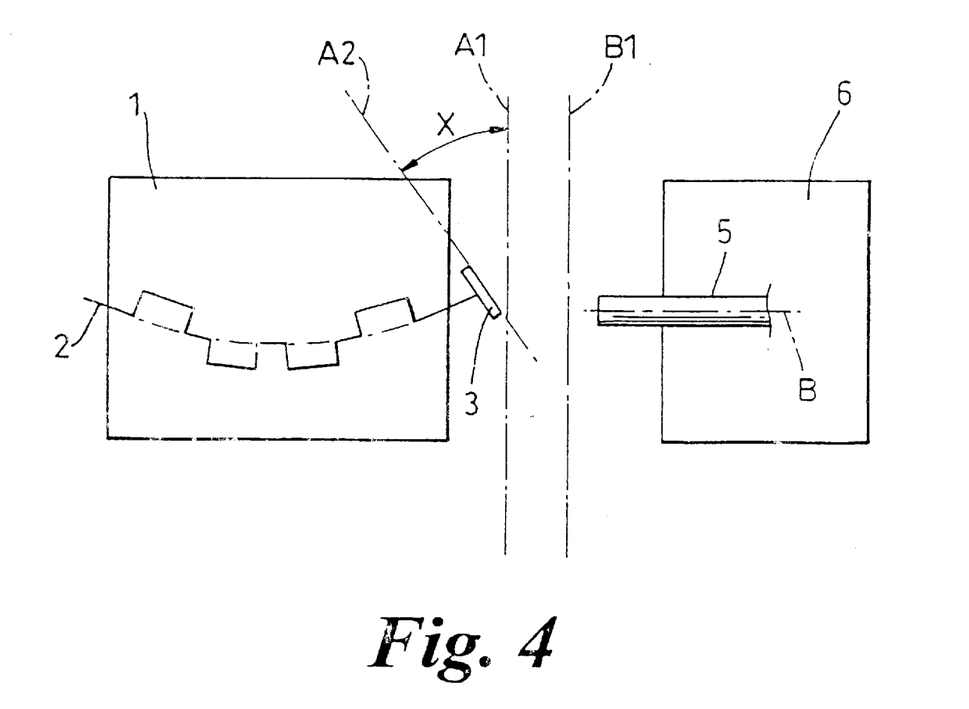
FIG. 4 is a diagrammatic representation of an engine and associated gearbox showing the engine crankshaft flexing.

During operation of the engine, the engine crankshaft 2 can flex, as shown diagrammatically in FIG. 4. This flexing can be a first order vibration (i.e. the crankshaft flexes once per revolution) second order vibration (i.e. the crankshaft flexes once per two revolutions typically caused by the firing pulses in each cylinder in a 4 stroke engine) and also higher and lower orders of vibrations are possible. Such flexing causes the crankshaft flange 3 (and hence the attached input flywheel 11) to be tilted out of plane A1 in which it normally generally lies by a relatively small but significant amount (X degrees) and into plane A2. Because of the complicated nature of the crankshaft flexing this tilting manifests itself as a tilting vibration which may take the form of a swashing and/or axial movement of the input flywheel.

However the transmission does not cause any such tilting vibrations or swashing in the output flywheel which continues to lie generally in plane B1.

Thus in conventional twin mass flywheels there is a 'fight' between the forces tilting the input flywheel 11 out of its plane A1 and the forces keeping the output flywheel 12 in its true plane B1. This causes stresses in the twin mass flywheel components with the components of each flywheel mass tilting as they rotate by differing amounts depending on the stiffness of the various components. Typically these stresses are seen in the components which link the two flywheels, that is the damping arrangement and the bearing, thus reducing their service life.

However, in the arrangement of the present invention the 'fight' is significantly reduced since the self-aligning bearing 50 allows the input flywheel to lie in any plane as dictated by the flexing of the crankshaft, whilst also allowing the output flywheel to continue to lie in plane B1. Thus any misalignment or tilting of the planes of the input and output flywheels (A1, A2, B1) is accommodated in the self-aligning bearing rather than fought against. This reduces the stresses in the damping components and the bearing, thus increasing the service life of the twin mass flywheel. The range of tilting between the input and output flywheels which the self-aligning bearing 50 accommodates is typically from ±0.2 degrees to ±3.0 degrees and is more typically ±0.5 degrees.

In particular, once the self-aligning bearing allows the output flywheel to rotate true in the plane B1, the bob weight 41 which is mounted in the output flywheel also runs true and is no longer forced to move back and forth axially as a result of tilting of the input flywheel. This significantly reduces the stresses on the pivot between the bobweight and the output flywheel thus increasing its service life.

Belleville springs 50a act to bias the planes of the input and output flywheels (A1, B1) parallel to each other and this can be advantageous in some circumstances e.g. during balancing or assembly of the twin mass flywheel.

Figure 5:
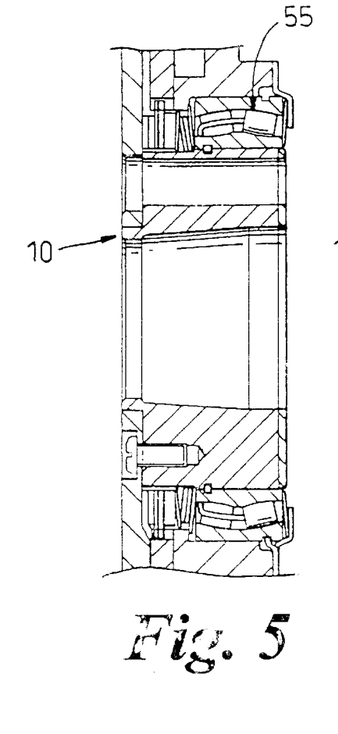
FIGS. 5 to 10 show alternative bearing arrangements for the twin mass flywheel of FIG. 2.

Under some circumstances it may be necessary to temporarily rigidly fix the planes of the input and output flywheels (for example by the use of a jig) during balancing of the twin mass flywheel assembly as a whole or during assembly of the twin mass onto the engine FIG. 5 shows a modified version of the twin mass flywheel of FIG. 2 in which a double row self-aligning roller bearing 55 is used instead of the double row self-aligning ball bearing 50.

Figure 6:
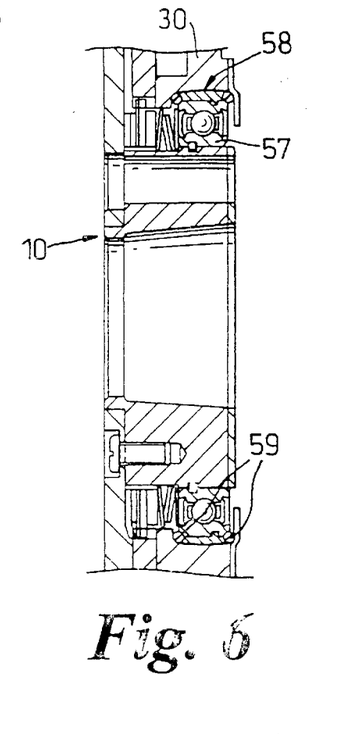

FIG. 6 shows a further modified version of the twin mass flywheel of FIG. 2 with a bearing arrangement consisting of a standard rolling element bearing 57 with a collar 58 having a spherical outer surface, used in place of the double row self-aligning ball bearing 50.

In this case, the spherical outer surface bears against a corresponding spherical surface in the output plate 30 (which may be formed directly on plate 30 or on a separate sleeve) and allows tilting of the input and output flywheels. Polymeric O-rings 59 act to bias the planes of the input and output flywheels into a parallel position. It can be advantageous if the collar 58 is made from a heat insulating material such as a plastics material so that the bearing is insulated from the heat generated on the output plate during clutch engagements and disengagements.

Figure 7:
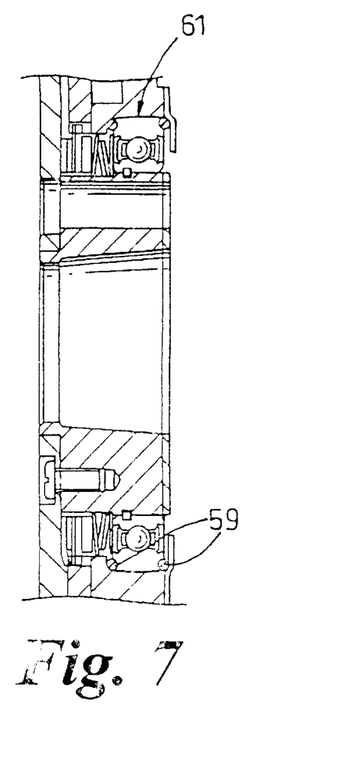

FIG. 7 is a modified version of the twin mass flywheel of FIG. 6 with a bearing arrangement consisting of a rolling element bearing 61 with a unitary spherical outer surface used in place of the bearing arrangement of FIG. 6 in which the spherical surface is formed on a separate collar 58.

Figure 8:
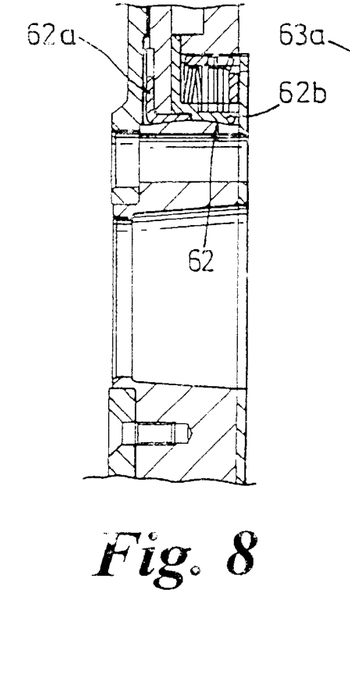
Figure 9:
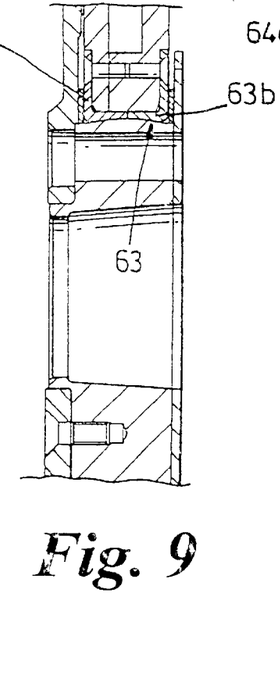
Figure 10:
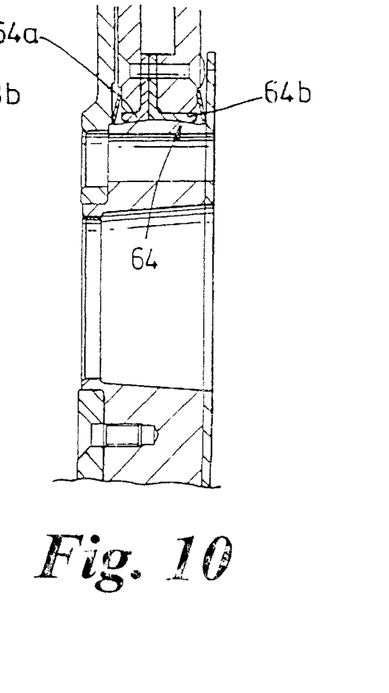

The bearing allowing relative rotation of the flywheel masses need not be a rotating element bearing. FIGS. 8, 9 and 10 show plain bearing arrangements 62, 63, 64 with a spherical surface formed integrally with the hub which co-operates with a further spherical surface formed by annular rings with L-shaped cross sections 62a, 62b:63a, 63b:64a,64b respectively which are attached to the output flywheel.

It can also be advantageous if some or all of the pivots 43,44,45 in the linkage arrangement 40 are self-aligning bearings.

Figure 11:
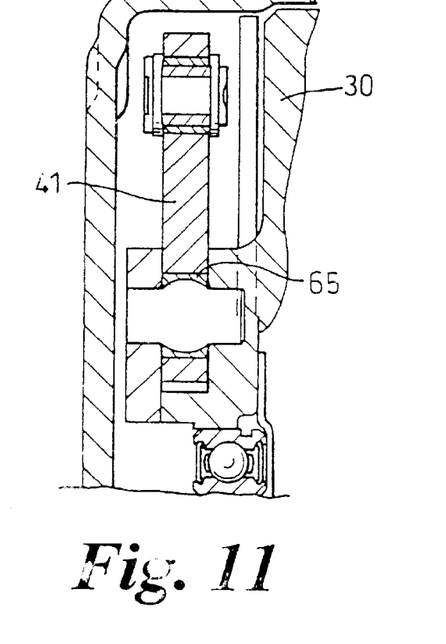
FIGS. 11 and 12 show alternative versions of the pivots 43 of FIG. 1.
Figure 12:
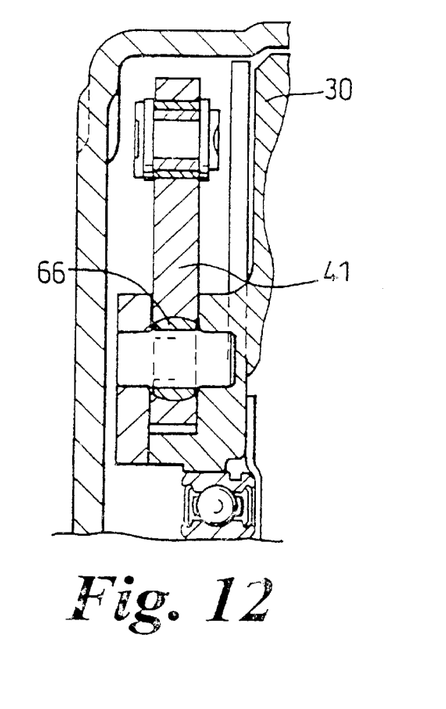

FIGS. 11 and 12 show self-aligning plain bearings 65,66 which allow pivotal and tilting movement of the bob weight relative to the output flywheel 30.

Different engines have different vibration characteristics and for a specific installation only one of the main support bearing 50 and pivot bearing sets 43, 44 and 45 need be a self-aligning bearing, However for different installations any two or more of the main support bearing 50 and pivot bearing sets 43, 44 or 45 could be self-aligning. It may be desirable in some installations to use one or more self-aligning pivot bearings only and not to use a self-aligning main bearing 50.

Figure 13:
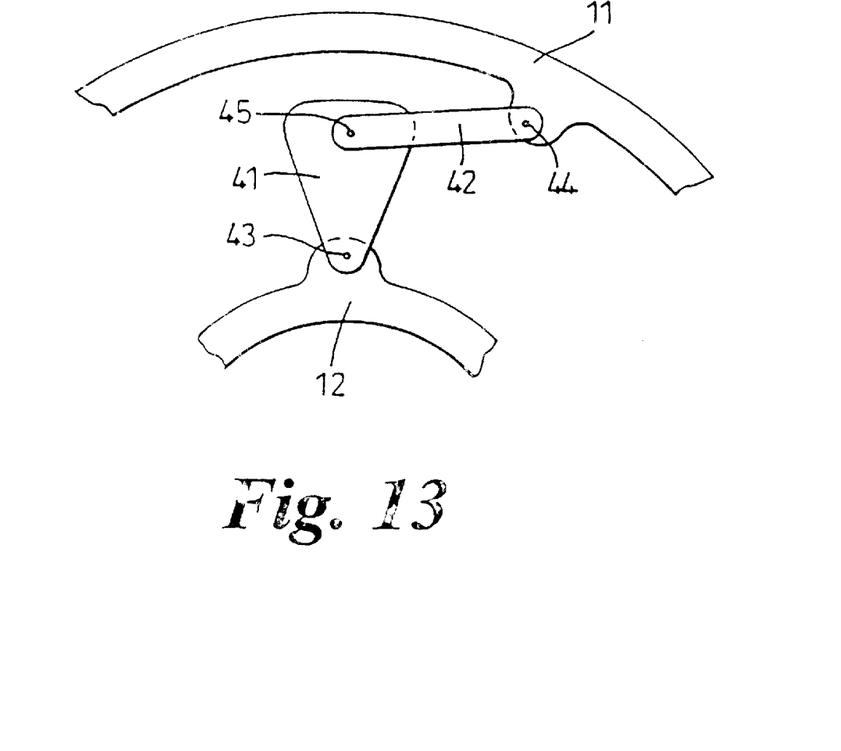
FIG. 13 is a diagrammatic representation of the damping means of the twin mass flywheel of FIG. 1.
Figure 14:
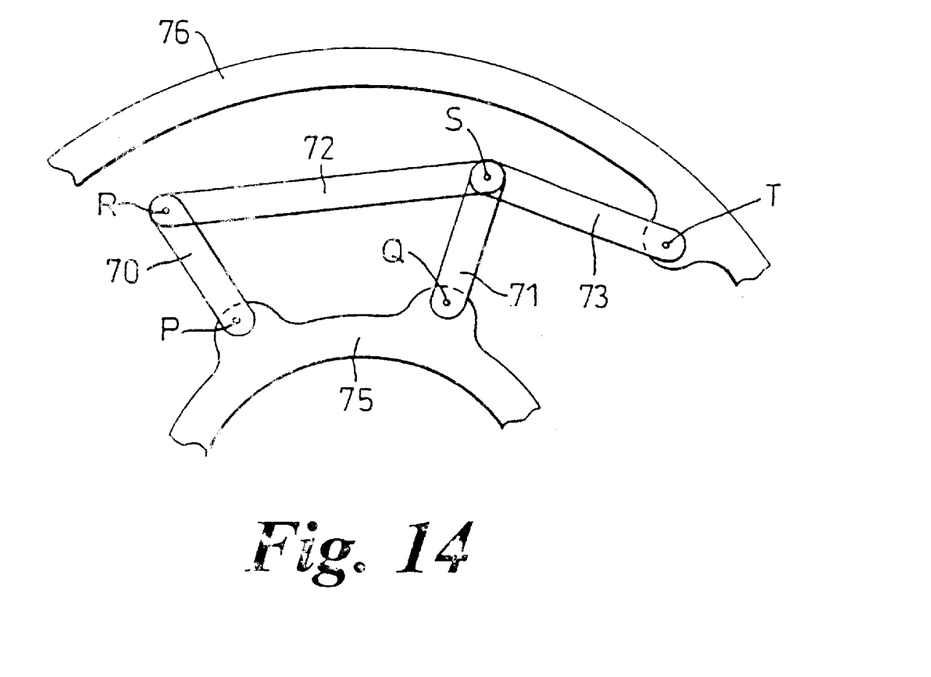
FIG. 14 is a similar diagrammatic representation of an alternative multi-link damping means for use between the masses of a twin mass flywheel.

FIG. 13 shows a diagrammatic representation of the twin mass flywheel of FIG. 1. FIG. 14 shows a similar diagrammatic representation of one of the embodiments of the applicants prior published patent application No PCT/GB97/00361 in which there is described:

A twin mass flywheel comprising first and second co-axially arranged flywheel masses (75,76) which are mounted for limited angular rotation relative to each other, the flywheel masses being interconnected by at least one linkage arrangement the or each linkage arrangement comprising a multi-link linkage having two or more circumferentially spaced main links (70,71) pivotally mounted (P,Q) on one of the flywheel masses (75) with the or each circumferentially adjacent pair of main links interconnect via a generally circumferentially extending connecting linkage (72) and an anchor link (73) which connects the multi-link linkage with the other flywheel mass (76), relative rotation of the flywheel masses causing the multi-link linkage to be pivoted relative to said one flywheel mass by the anchor link, so that when the twin mass flywheel is rotating, relative rotation of the flywheel masses is resisted by centripetal forces acting on the linkage arrangement.

One or more of the pivots P,Q,R,S,T, or the main support bearing which allows reactive rotation of the flywheel masses can be a self-aligning bearing. Similarly any one or more of the bearings of the various other multi-linkage arrangements described in the applicants prior published patent application No PCT/GB97/00361 could be a self-aligning bearing.

Figure 15:
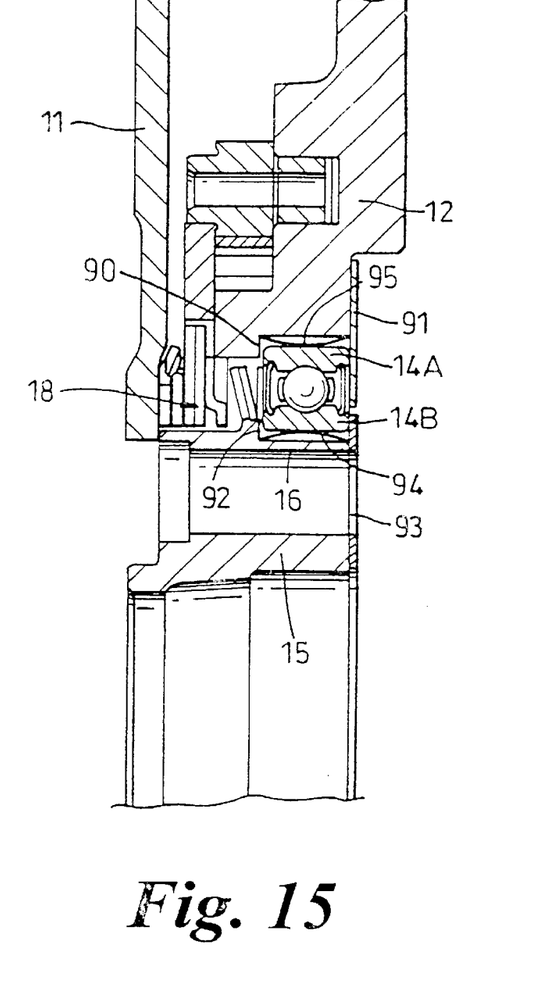
FIG. 15 shows an alternative bearing arrangement using tolerance rings.

FIG. 15 shows another arrangement in which tilting of the inner flywheel mass 11 relative to the output mass 12 as a result of crankshaft flexing is again accommodated. In FIG. 15 the outer race 14A is held captive between an abutment 90 on the output flywheel mass 12 and a retaining member 91 which is rivetted to the output flywheel mass as previously described in relation to component 84. The inner race 14B is similarly located between an abutment 92 on the bearing carrier 15 and a retaining member 93 which may be secured in position either by bolts 44 as previously described or by completely independent fastening means.

Inboard of inner race 14B and outboard or outer race 14A two annular and slightly resilient corrugated tolerance rings 94 and 95 are located which support the bearing races against radial movement relative to the bearing carrier 15 and output flywheel mass 12 respectively. Use of these tolerance rings enables the radial surfaces against which the bearing races are supported to be manufactured to a lower level of manufacturing tolerance thus reducing the cost of production of the twin mass flywheel. The tolerance rings 94 and 95 are sufficiently radially resilient to accommodate flexing of the engine crankshaft which results in tilting of the input mass 11 relative to the output mass 12 during use of the flywheel.

Figure 16:
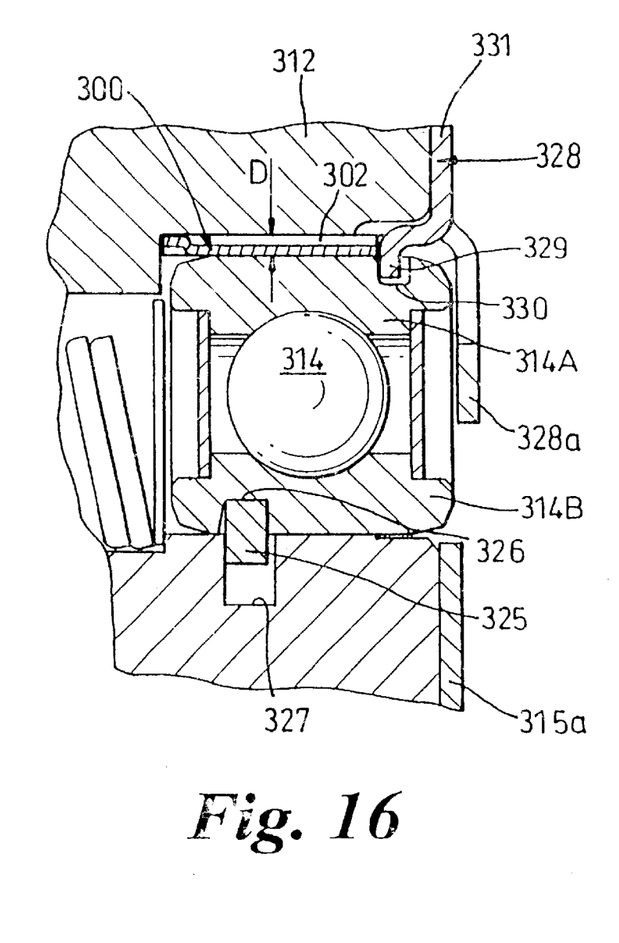
FIG. 16 shows a further bearing arrangement using a tolerance ring.
Figure 17:
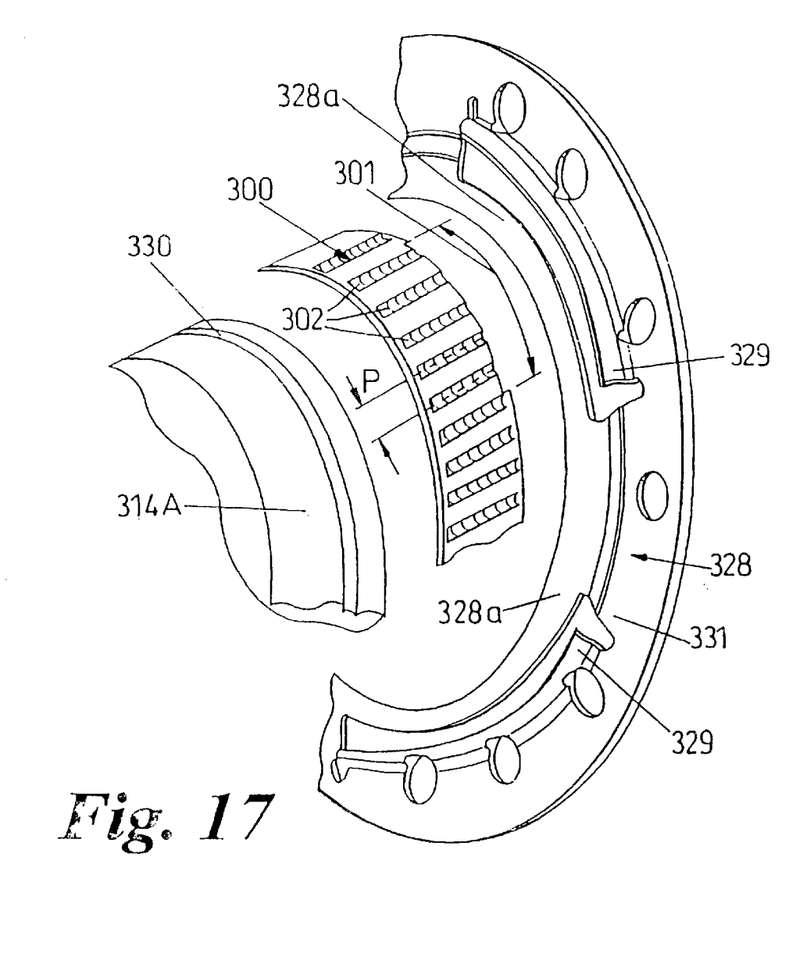
FIG. 17 is an exploded view of part of FIG. 16.

FIGS. 16 and 17 show a further bearing arrangement, basically similar to that shown in FIG. 2, which uses a corrugated metal tolerance ring 300 located between outer bearing race 314A and the associated output flywheel mass 312. This tolerance ring arrangement again, as in the arrangement shown in FIG. 10, reduces costs and accommodates flexing of the engine crankshaft which results in the tilting of the input flywheel mass relative to the output mass. The fingers 329 of retaining member 328 extend through edge slots 301 in tolerance ring 300 and engage groove 330 in outer race 314A.

In certain applications it may be desirable to combine parts of the retaining member 328 with the tolerance ring 300, for example fingers 329 may be formed along one edge of tolerance ring 300 and/or flange 331 formed along the other edge. Typically in a tolerance ring of a nominal 115 mm diameter the pitch P of the individual corrugations 302 is 6.30 mm, the thickness of the metal is 0.5 mm and the total depth 'D' of the ring before installation is 1.25 mm. This depth 'D' is typically designed to be reduced by 0.225 mm when installed to provide an inherent spring force in the tolerance ring.

Tolerance rings can be used singularly at either of the peripheries of the bearing or at both peripheries, as shown in FIG. 15.

The closed ends of the corrugations 302 contribute greatly to the stiffness and stability of the tolerance ring.

In certain applications open-ended corrugations may be required to give the tolerance ring greater compliance.

Figure 18:
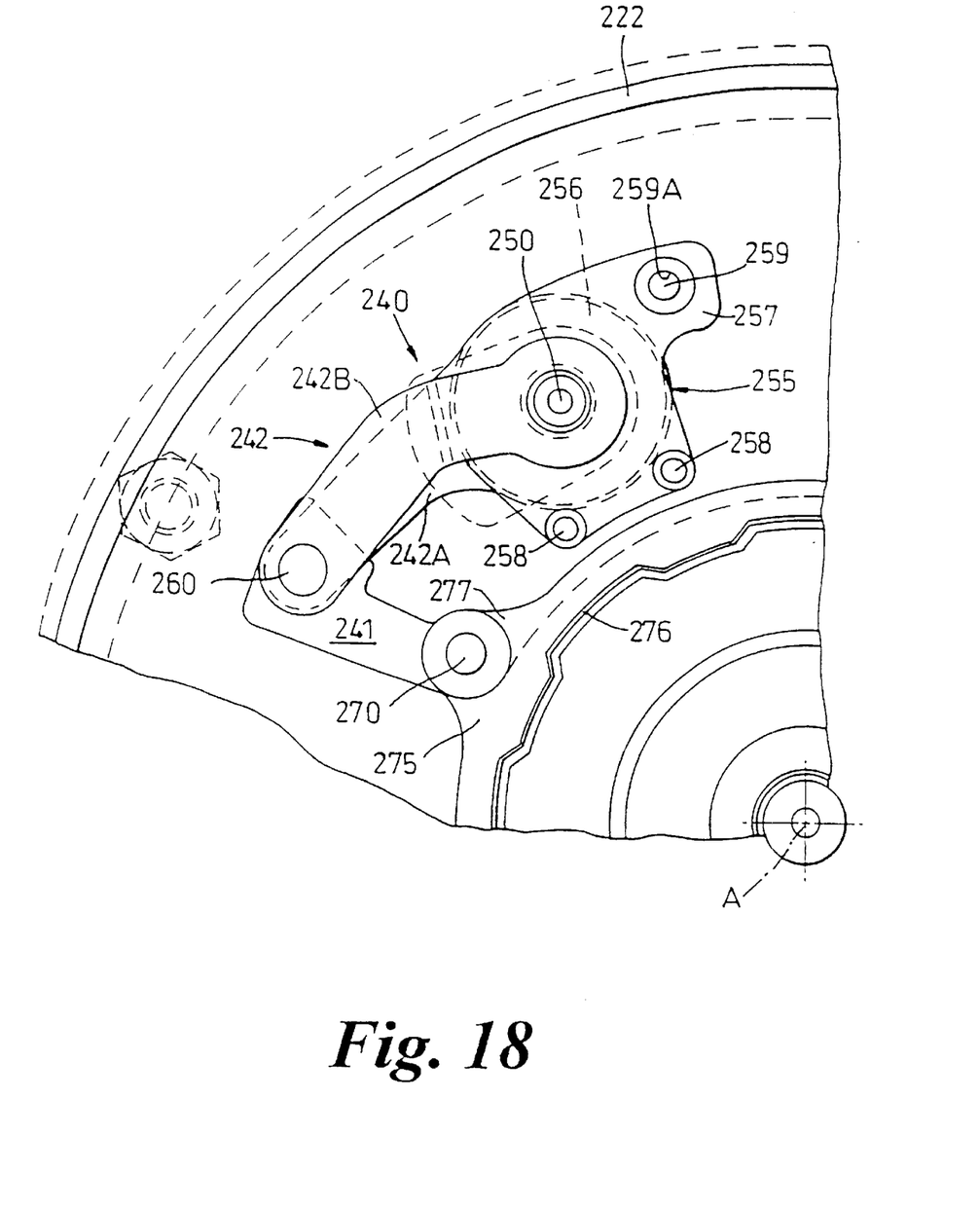
FIGS. 18 and 20 show the application of self-aligning linkage pivots to a torsional vibration damper used in conjunction with a fluid coupling.
Figure 19:
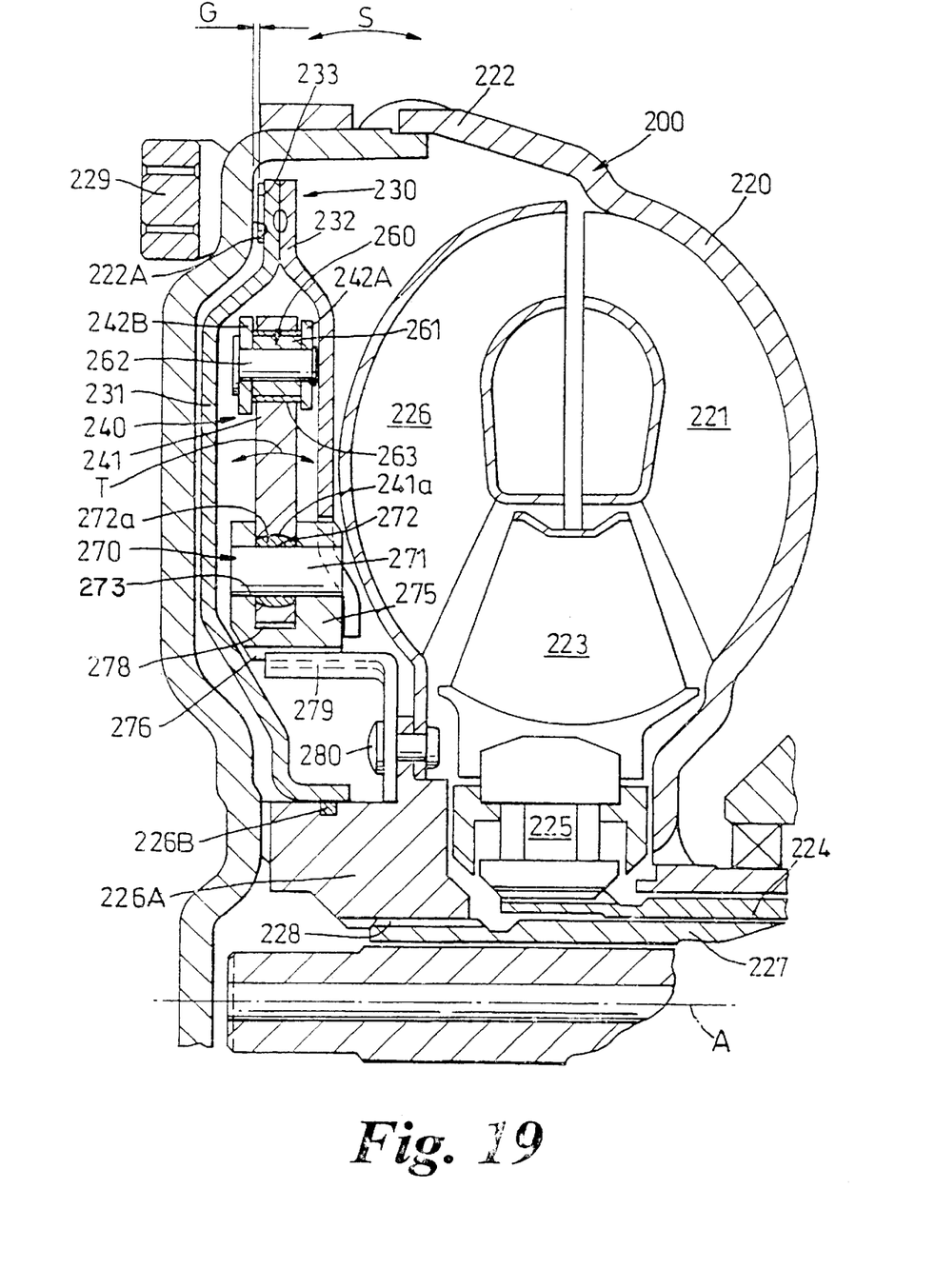
Figures 20, 21:
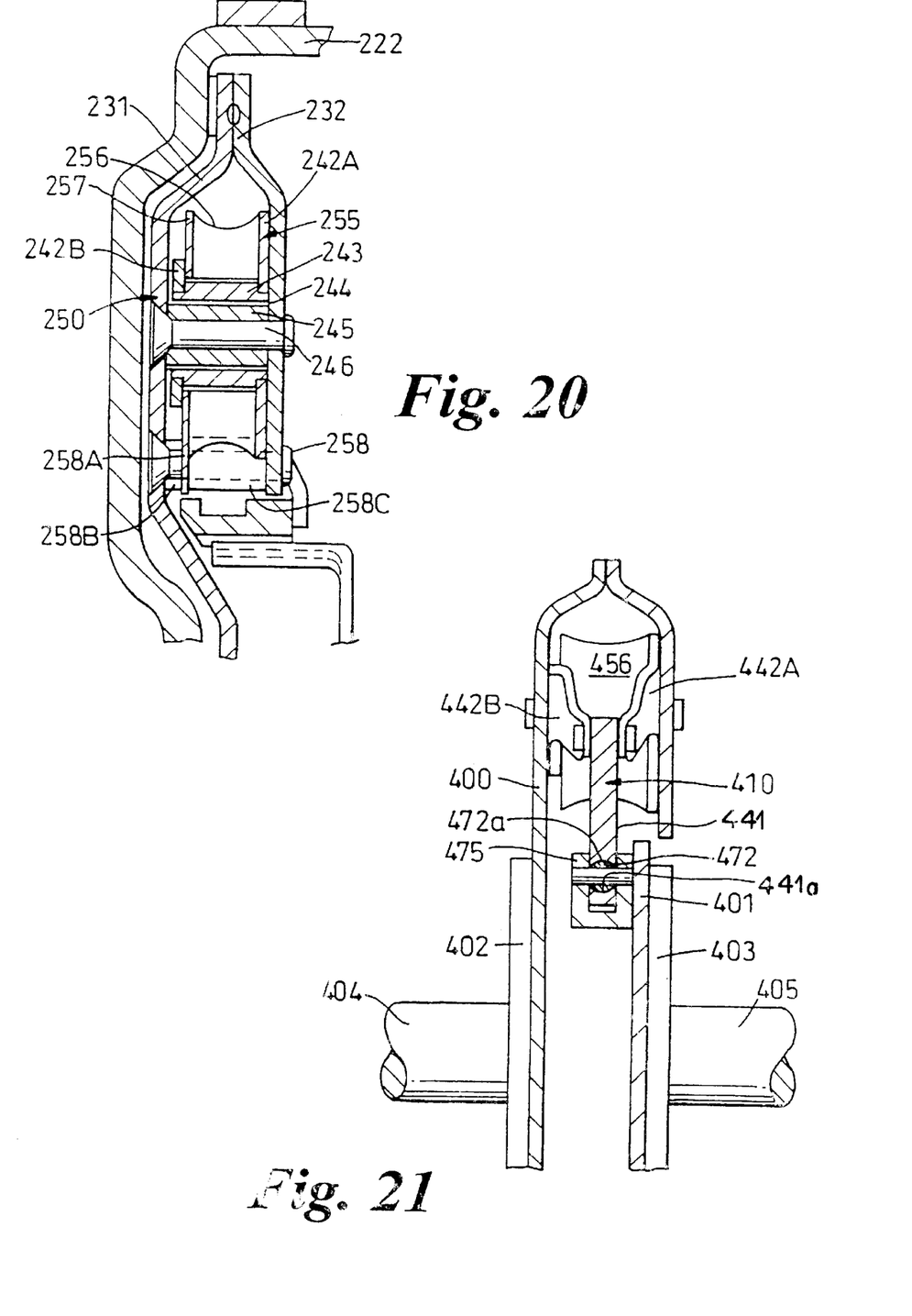
FIG. 21 shows the application of self-aligning linkage pivots to an independent torsional vibration damper.

FIGS. 18 to 20 show the application of the self-aligning bob weight pivot bearing arrangement of FIGS. 11 or 12 to a power transmitting arrangement 200 which includes a fluid coupling 220 a clutch 230 and a torsional vibration damper in the form of a plurality of linkage arrangements 240 (only one shown) spaced circumferentially around the power transmitting arrangement.

The fluid coupling 220 comprises an impeller 221 secured to a rotatable housing 222, a stator 223 which is linked to a stationary member 224 by way of a sprag clutch 225 which allows the stator to free wheel during conditions of over-run, for example when the road wheels of a vehicle incorporating the power transmitting arrangement would otherwise be driving the engine, and a turbine 226 which transmits torque to the transmission input shaft 227 by way of a turbine hub 226A and a splined drive 228.

Power is transmitted from the impeller 221 to the turbine 226 via the circulation of fluid in a manner well known in the art.

Note that fluid coupling 220 is known as a torque converter fluid coupling. However further embodiments of the invention could use other types of fluid couplings such as a non-torque converting fluid coupling.

The housing 222 is connected for rotation with a crankshaft (not shown) of an associated engine by way of a plate (not shown). The plate is secured to the housing 222 via bolts (not shown) threaded into the nuts 229.

Thus it is possible to transmit power from the crankshaft of the engine to the input means of the impeller (e.g. housing 222) and then through the impeller and turbine to the output means of the turbine (e.g. the turbine hub) to the input shaft of the gearbox.

The engageable clutch 230 consists of two side plates 231,232 and a friction facing 233. When the clutch 230 is disengaged there is a gap G between the friction facing 233 and a friction surface 222A of the housing 222. Movement of the clutch 230 to the left (when viewing FIG. 19) engages the friction facing 233 with the friction surface 222A of the housing 222. When engaged, the clutch 210 rotates at the same speed as the housing 222.

The radially inner portion of the side plate 231 is formed in an axial direction and contacts a seal 226B mounted on the turbine hub 226A to ensure no passage of fluid occurs between the side plate 231 and the turbine hub 226A.

Side plates 231 and 232 act as input means for the torsional vibration damper formed by the linkage arrangement 240. Each linkage arrangement consists of two links, a generally radially extending main link 241 and an anchor link 242. In this embodiment the anchor link consists of a pair of anchor link plates 242A and 242B which move in unison but in further embodiments the anchor link could comprise only a single plate.

The main link is pivotally connected to the anchor link by a pivot 260 and is also pivotally connected to a linkage hub 275 by a pivot 270. The anchor link is also pivotally connected to the side plates 231, 232 by a pivot 250.

Pivot 250 comprises a shouldered tube 243 which has a friction reducing bush 244 press fitted into its internal diameter. The anchor link plates 242A,242B each have a hole which is press fitted onto an outer diameter of respective ends of the tube 243. The pivot 250 further comprises a hollow pin 245 which is held rotationally fast between the side plates 231 and 232 by rivet 246 with the shouldered tube 243 and bush 244 being able to rotate about the hollow pin 245.

Additionally associated with pivot 250 there is a controlling means 255 which controls the rotation of the anchor link 242 (and in particular anchor link plate 242A) relative to the side plates 231, 232. This controlling means is in the form of a disc of elastomeric material 256 which is bonded on one axial side to the anchor link plate 242A and is bonded on the other axial side to a plate 257. Both plate 257 and the disc of elastomeric material 256 have a central hole which is a clearance fit on the outside diameter of the shouldered tube 243. Plate 257 is fixed rotationally fast to side plates 231, 232 by rivets 258 passing through holes 258A and hollow spacers 258B and 258C and is additionally held rotationally fast within plate 231 via rivet 259 passing through hole 259A. Any rotation of anchor link plate 242A relative to side plate 231 causes the elastomeric material to be wound up in torsion. Anchor link plate 242B moves in unison with anchor link plate 242A and ensures pivots 250 and 260 are loaded evenly.

Pivot 260 comprises a hollow pin 261 which is clamped between the anchor link plates 242A, 242B by rivet 262 which pass through the hollow pin 261 and through holes in anchor link plates 242A, 242B. The pivot also comprises a friction reducing bush 263 which is press fitted into a hole in the main link 241. Thus bush 263 and main link 241 can rotate in unison about hollow pin 261

The linkage hub 275 is annular in shape and has a splined tooth form 276 on its inner periphery. On the outer periphery of the linkage hub 275 are circumferentially spaced lobes 277 (only one shown). Each lobe has a circumferential groove 278 which accepts a portion of an associated main link 241. Each lobe 277 has an axial hole 279.

The pivot 270 comprises a pin 271 which is a press fit in the hole 273. In accordance with the present invention the pin 271 also passes through a friction reducing bush 272 having a part spherical outer surface 272a which co-operates with a corresponding part-spherical surface 241a in the main link 241 (similar to the arrangement shown in FIG. 12). Thus main link 241 is able to rotate about pin 271 and to tilt relative to pin 271 as indicated by arrow T in FIG. 19 should the housing 222 of the coupling 220 tilt (as indicated by arrow S) relative to axis A as a result of the flexing of the engine crankshaft as described with respect to FIG. 4.

The spline tooth form 276 of the linkage hub 275 engages rotationally fast axially slidably with spline drive 279. Spline drive 279 is rotationally fast (via rivet 280) with the turbine hub 226A.

Operation of the power transmitting arrangement in an associated vehicle is as follows:

With the associated engine running, and a gear ratio of the associated gearbox selected with the associated vehicle stationary or travelling at low speed the clutch 230 remains disengaged. The hydraulic fluid within the housing 222 is driven via the impeller 221 and tends to rotate the turbine 226. Depending on various operating parameters of the associated vehicle the turbine 226 will rotate at a speed somewhat less than the speed of the impeller 221 i.e. the fluid coupling 220 will slip. If certain pre-determined conditions are met, for example when the speed of the turbine 226 is only marginally slower than the speed of the impeller 221, the hydraulic fluid in the region of the housing 222 to the left of side plate 231 (as viewed in FIG. 19) is allowed to evacuate to a reservoir. The resultant higher pressure acting on the right hand side of side plate 231 (as viewed in FIG. 19) causes the side plates 231, 232, linkage arrangement 240 and linkage hub 275 to move to the left, closing gap G and engaging the clutch 230. Power is now also capable of being transmitted from the engine to the input shaft of the gearbox via the engaged clutch 230 and the linkage arrangements 240.

Each linkage arrangement is able to transmit power once the clutch 230 is engaged in the following manner:

Centripetal forces acting on link 241 tend to move its centre of gravity to a position radially outboard of pivot 270 i.e. to its centripetally neutral position. As the linkage arrangement is required to transmit torque the linkage hub 275 rotates relative to the clutch 230. This rotation is progressively resisted via the linkage arrangement since the link 241 moves away from, but endeavours to return to, its centripetally neutral position as the relative rotation occurs.

In addition to the controlling influence of the linkage arrangement 240, when the clutch 230 rotates relative to the linkage hub 275 the anchor link plate 242A rotates relative to the plate 257 causing the elastomeric material 256 to wind up in torsion (as previously described). The elastomeric material 256 is thus a controlling means which has a controlling influence on the relative rotation of the input means to the impeller (e.g. housing 222) and the output means from the turbine (e.g. turbine hub 226A).

The linkage 240 thus operates as a torsional vibration damper whose torsional stiffness varies with the speed of rotation of the linkage.

If desired the part spherical surfaces 241a and 272a can be replaced by the alternative arrangement shown in FIG. 11.

The other pivots, e.g. pivot 260, of the linkage arrangement 240 can also employ self-aligning bearings of the type described above in relation to pivot 270.

FIG. 21 shows an alternative torsional vibration damper in accordance with the present invention which comprises an input element 400 and an output element 401 between which are connected a plurality of linkage arrangements 410 similar to the linkage arrangement 40 shown in FIG. 1 with equivalent parts such as a first or main link 441, a second link having a pair of arms 442A and 442B pivotally attached to the input element 400 and to the first link 441 which has one end pivotally attached to a linkage hub 475 which is attached to the output member 401. An elastomeric member 456 is mounted between the arms 442A and 442B. The input element 400 and the output element 401 are respectively bolted to flanges 402 and 403 on shafts 404 and 405 of a vehicle drive-line. Such a torsional vibration damper operates independently and can be incorporated at any appropriate position in the vehicle drive-line.

As will be understood the linkage arrangement 410 may include any of the self-aligning link pivot arrangements described above, for example the arrangements of FIGS. 11, 12 and 19 and is illustrated, in FIG. 21, with part spherical surfaces 472a and 441a on the bush 472 and main link 441 respectively. This self-aligning link pivot arrangement enables the torsional vibration damper to accommodate flexing of the engine crankshaft which results in tilting of input element 400 relative to the output element 401 as previously described with reference to FIG. 4.

What is claimed is:

1. A torsional vibration damper comprising an input member designed to rotate in a first plane, an output member designed to rotate in a second plane, main bearing means supporting the input and output members for relative rotation, and damping means for controlling said relative rotation, said damping means including at least one linkage arrangement having a first link pivotally mounted on one of the members and connected with the other member via a second link, one end of said second link being pivotally connected with the first link and the other end of said second link being pivotally connected with the other member, at least one of the pivotal connections between the first and second links and the pivotal connection of each link with its respective input or output member being in the form of a self-aligning pivot bearing which allows the first and second planes in which the two members rotate to tilt relative to each other during use of the damper.

2. A torsional damper according to claim 1 in which the main bearing means is also a self aligning bearing.

3. A torsional damper according to claim 2 in which the main bearing means is a plain spherical bearing.

4. A torsional damper according to claim 2 in which the main bearing means is a self-aligning rotating element.

5. A torsional damper according to claim 4 in which the main bearing is a self-aligning ball race bearing.

6. A torsional damper according to claim 4 in which the main bearing is a self-aligning roller bearing.

7. A torsional damper according to claim 4 in which the main bearing means has an outer or inner race which has a substantially part spherical outer or inner radial mounting surface which co-operates with a bore or a shaft of the input or output member to allow the plane of the input flywheel to tilt relative to the plan of the output member.

8. A torsional damper according to claim 7 in which the substantially part spherical outer or inner radial mounting surface is unitary with the appropriate bearing race.

9. A torsional damper according to claim 7 in which the substantially part spherical outer or inner radial mounting surface is formed on a separate component from the race.

10. A torsional damper according to claim 9 in which the separate component is biased into a centralized position by resilient O-rings.

11. A torsional damper according to claim 9 in which the separate component is of a plastics material.

12. A torsional damper according to claim 11 in which the plastics component acts as a heat insulator between the main bearing means and the adjacent input or output member.

13. A torsional damper according to claim 4 in which the main bearing means is supported on at least one of its inner or outer peripheries in a resilient support carried by the associated input or output member to allow said tilting.

14. A torsional damper according to claim 13 in which the resilient support comprises a resilient tolerance ring.

15. A torsional damper according to claim 13 in which the resilient support comprises a resilient plastics sleeve.

16. A torsional damper according to claim 14 in which the resilient tolerance ring includes generally radially extending projections which engage a groove or other formation in the associated main bearing means to locate the bearing axially relative to the associated input or output member.

17. A torsional damper according to claim 1 in which the first link is in the form of a bob weight.

18. A torsional damper according to claim 1 in which the or each linkage arrangement comprises a multi-link linkage having two or more circumferentially spaced main links pivotally mounted on one of the members with the main links interconnected via a generally circumferentially extending connecting linkage pivotally connected to respective main links, and an anchor link which pivotally connects the multi-link linkage with the other member, relative rotation of the input and output members causing the multi-link linkage to be pivoted relative to said one member by the anchor link, so that when the damper is rotating, relative rotation of the members is resisted by centripetal forces acting on the linkage arrangement, at least one of the pivots of the multi-link linkage and anchor link being in the form of a self-aligning bearing.

19. A torsional damper according to claim 1 in which the or self-aligning bearing of the or each linkage is a spherical bearing.

20. A torsional damper according to claim 1 in which the planes of the input and output members are biased towards a specific orientation.

21. A torsional damper according to claim 1 in the form of a twin mass flywheel in which the input and output members comprise input and output flywheel masses respectively supported from each other for relative rotation via the main bearing means.

22. A method of installing a torsional vibration damper as defined in claim 1 in its operation position comprising temporarily rigidly fixing the input and output members to each other during installation and subsequently releasing said members for operation of the damper.

23. A method of balancing a torsional vibration damper according to claim 1 said method comprising temporarily rigidly fixing the input member relative to the output member, balancing the damper as a whole with the members rigidly fixed, and releasing the rigid fixing of the members subsequent to balancing for operation of the damper.

24. A power transmitting arrangement characterized by comprising the combination of a torsional vibration damper as defined in claim 1 in combination with a fluid coupling.

* * * * *